(12) United States Patent
Dannenmaier et al.

(10) Patent No.: US 7,790,029 B2
(45) Date of Patent: Sep. 7, 2010

(54) FILTER DEVICE HAVING MORE THAN ONE FILTRATION COMPARTMENT

(75) Inventors: Juergen Dannenmaier, Balingen (DE); Manfred Pirner, Hechingen (DE); Hermann Goehl, Bisingen-Zimmern (DE)

(73) Assignee: Gambro Lundia AB, Lund (SE)

( * ) Notice: Subject to any disclaimer, the term of this patent is extended or adjusted under 35 U.S.C. 154(b) by 1566 days.

(21) Appl. No.: 10/708,774

(22) Filed: Mar. 24, 2004

(65) Prior Publication Data

US 2004/0200768 A1 Oct. 14, 2004

Related U.S. Application Data

(60) Provisional application No. 60/462,553, filed on Apr. 11, 2003.

(30) Foreign Application Priority Data

Apr. 11, 2003 (EP) .................. 03008465

(51) Int. Cl.
*B01D 63/02* (2006.01)
*B01D 63/04* (2006.01)
*B01D 61/00* (2006.01)

(52) U.S. Cl. .................. 210/321.71; 210/321.78; 210/321.79; 210/321.8; 210/321.88; 210/321.89

(58) Field of Classification Search .................. None
See application file for complete search history.

(56) References Cited

U.S. PATENT DOCUMENTS

| 4,038,190 | A | | 7/1977 | Baudet et al. |
| 4,211,597 | A | | 7/1980 | Lipps et al. |
| 4,226,378 | A | * | 10/1980 | Fitzgerald et al. ........ 242/487.1 |
| 4,341,005 | A | * | 7/1982 | Oscarsson .................. 29/411 |
| 4,343,668 | A | | 8/1982 | Francisoud et al. |
| 4,861,485 | A | * | 8/1989 | Fecondini .................. 210/641 |
| 5,730,712 | A | * | 3/1998 | Falkvall et al. ............. 604/5.01 |
| 5,882,516 | A | | 3/1999 | Gross et al. .............. 210/321.6 |

(Continued)

FOREIGN PATENT DOCUMENTS

DE 33 26 704 A1 1/1985

(Continued)

OTHER PUBLICATIONS

European Search Report, European Patent Office, issued Sep. 5, 2003 for European Application No. EP 03 00 8465, 4 pages.

*Primary Examiner*—Krishnan S Menon
(74) *Attorney, Agent, or Firm*—Pearne & Gordon LLP

(57) ABSTRACT

A filter device having filter means, in particular hollow fiber membranes, arranged in more than one filtration compartment within a filter housing. The filter device thereby allows more than one filtration process to be carried out serially and/or simultaneously within a single housing. For example a dialysis type filtration process such as hemofiltration or hemodiafiltration or hemodialysis may be carried out at the same time as an ultrafiltration process or as another hemofiltration, hemodiafiltration or hemodialysis process. The device may have a split shell construction bonded or welded together along longitudinal seams. Internal separating walls within the housing are formed integrally with the shell portions of the housing to form adjacent filtration compartments when the housing portions are joined together.

16 Claims, 14 Drawing Sheets

U.S. PATENT DOCUMENTS

| | | |
|---|---|---|
| 6,074,559 A | 6/2000 | Hahmann et al. |
| 6,426,002 B1 | 7/2002 | Hahmann et al. |
| 6,830,685 B2 | 12/2004 | Pope et al. |
| 2002/0153314 A1 | 10/2002 | Hahmann et al. |
| 2003/0102264 A1* | 6/2003 | Pope et al. .................. 210/646 |
| 2004/0127842 A1* | 7/2004 | Collins et al. .............. 604/6.09 |

FOREIGN PATENT DOCUMENTS

| | | |
|---|---|---|
| DE | 196 07 162 A1 | 9/1997 |
| EP | 0 264 695 A2 | 4/1988 |
| EP | 0 305 687 A1 | 3/1989 |
| EP | 0 355 325 A1 | 2/1990 |
| EP | 0 525 317 A1 | 2/1993 |
| EP | 0 890 368 A1 | 1/1999 |
| FR | 2 231 421 A1 | 12/1974 |
| FR | 2 506 626 A3 | 12/1982 |
| WO | 00/44478 A1 | 8/2000 |
| WO | 01/49399 A1 | 7/2001 |
| WO | 02/47785 A1 | 6/2002 |

* cited by examiner

FILTER DEVICE HAVING MORE THAN ONE FILTRATION COMPARTMENT

CROSS REFERENCE TO RELATED APPLICATIONS

This application claims the benefit of U.S. Provisional 60/462,553, filed Apr. 11, 2003 and EP 03008465.1, filed Apr. 11, 2003.

BACKGROUND OF INVENTION

The present invention relates to a filter device for the filtration of fluids. In particular, one or more embodiments of the present invention relates to filter devices for use in dialysis-type treatments and for filtration processes similar to and related to the hemodialysis process, such as hemofiltration, hemodiafiltration and ultrafiltration, as well as to a method for making a housing of a filtration device.

Filter devices having hollow fibers or membranes are used, for example, in the area of dialysis for a wide variety of purposes. Such filters may be referred to as dialysers, these being used for example in hemodialysis, in which blood is directed into and along the inside of the semi-permeable walls of the hollow fibers while dialysis fluid is directed around the outside of the hollow fibers. Various convection and diffusion processes may thereby take place across the walls of the hollow fibers. These processes serve, for example, to purify and to remove excess fluid from the blood. Additionally, the electrolyte concentration in the blood can be conditioned using infusion fluids, and buffers such as bicarbonate or acetate can be added to the blood. The hemodialysis process is effective at removing substances having a low molecular weight, but may be less effective at removing substances having a middle molecular weight. Low molecular weight substances in the context of dialysis typically includes substances such as urea, having a molecular weight below 5 kDa.

Filter devices of this type may also be employed in so-called hemofiltration, in which a substitution fluid is added to the blood. According to this process, the blood is directed through the inside of the hollow fibers, although in this case no dialysis fluid is passed around the outside of the fibers. Here, excess fluids, in particular water as well as waste products, are removed from the blood by means of a pressure difference across the membrane, here comprised by the semi-permeable walls of the hollow fiber. The substitution fluid can be added either prior or subsequent to the filtration in pre- or post-dilution modes. Hemofiltration is more effective at removing substances having a so-called middle molecular weight lying within the range between approximately 5 kDa- and 0 kDa such as Beta-2-Microglobulin.

A further application for the present type of filter device includes hemodiafiltration: a combination of hemodialysis and hemofiltration, in which dialysate flows across one side of the membrane while blood flows across the other side and at the same time, a pressure gradient exists across the membrane. Infusion fluid may be added to the blood either prior to or after the filtration. This process can results in a higher filtration rate and is especially effective at removing substances having a low and middle molecular weight.

A further process for which such filters are may be used is known as plasmapheresis, in which aqueous blood plasma is filtered out of the blood and returned to the blood after treatment.

Such filter devices are also used in filtration processes such as reverse osmosis wherein undesirable substances may be removed from blood, water or other fluids.

The above-mentioned filter devices can equally be used as so-called ultrafilters for the production of substitution or infusion fluids. In this case, infusion fluid may be directed into the filter across one side of a semi-permeable membrane, and is filtered across the membrane by means of a pressure difference. In this way, the infusion fluid can be sterile-filtered by removal of endotoxins, bacteria and other contaminants. Ultrafilters generally have a similar construction to dialyser-type filters although they are generally smaller in dimension and are not generally used as dialysers in the dialysis process. Ultrafilters are usually employed during a blood filtration treatment in addition to a dialysis filter, the filtrate from the ultrafilter creating the infusion fluid which is then being fed into the blood either on the blood side of the dialysis filter device or into blood in the blood tubes.

These filter devices are usually so constructed that the hollow fibers are arranged as a loose bundle lying longitudinally within a tubular housing. The housing is provided at each end with an end cap and the hollow fiber bundle is arranged between the ends of the housing so that the end cap enclose the ends of the hollow fiber bundle. The ends of the fibers are usually embedded within and secured by a potting compound made from a two-component polymer resin. Except as noted below, the potting compound completely surrounds the ends of the hollow fibers and is molded to the inside of the ends of the housing to create a seal between the header chamber and the inside of the tubular housing.

The extreme ends of the hollow fibers which constitute the hollow fiber bundle open out above the potting compound into a hollow space (hereafter: header chamber) located between the end cap and the end of the hollow fiber bundle. It is therefore possible, with the appropriate arrangement of inlets and outlets, to provide, in a known manner various forms of filter such as the previously mentioned hemodialysis filters, hemofilters, hemodiafilters, ultrafilters etc. Examples of the previously mentioned filters are disclosed in EP-0 305 687, EP-0 355 325 and EP-0 525 317.

The previously mentioned filters or dialysers have certain features in common, namely, that a first fluid may be directed into and through the inside of the semi-permeable hollow fibers. This first fluid may exit from the fiber column having had certain substances removed and possibly certain substances added. A second fluid may be present on the outside of the hollow fibers. This second fluid can either flow through the housing, past and around the hollow fibers, via appropriately located inlet and outlet means, or it can be removed from the first fluid and directed out of the housing via a suitable outlet, for example by means of a pressure differential across the hollow fiber membrane. This second fluid may be a purified form of the first fluid, a dialysis fluid for the exchange of substances into and out of the first fluid across the hollow-fiber membranes, or a waste fluid removed from the first fluid, among others.

If one of the aforementioned filters is applied in the area of dialysis, for example in hemodialysis, various fluid lines (conduits) are connected to it. These fluid lines on the one hand lead blood from the patient to the blood side of the filter and then back to the patient. Additional fluid lines lead the dialysis fluid from a dialysis fluid supply, controlled by a dialysis machine, also sometimes referred to as a dialysis monitoring device, to the dialysate side of the filter and after passage through the filter further to a drain. The blood side here refers to the area of the filter through which the blood of the patient is led, while the dialysate side refers to the area of the filter or the filter housing through which the dialysis fluid is lea. The blood side and the dialysate side are separated from each other in the filter housing by the one or more semi-permeable membrane(s) and these sides correspond respectively to the sides along which the previously mentioned first and second fluids pass.

In order to improve the effectiveness of blood filtration treatments, it is known to use more than one filtration process or filter device connected in series. Thus, as an example, a hemofiltration process may be combined in series with a hemodialysis or hemodiafiltration process, thereby necessitating more than one filter device.

It has further been proposed to combine more than one filtration device within a single housing. A filter cartridge comprising more than one filtration compartment is disclosed for example in WO 02/47785. According to the device disclosed in this document, two hollow fiber bundles are arranged in adjacent compartments which are separated by a wall in which a communicating aperture is provided for the flow of filtrate or dialysate through both compartments.

Additional considerations with regard to the use of such filtration devices are also relevant for their design. When setting up known filter devices prior to a filtration treatment, a number of set-up operations are required to be performed by trained personnel. In particular, extracorporeal blood tubes as well as any necessary dialysis fluid tubes must be connected to the appropriate fluid flow ports of the filter device. In addition, a separate ultrafilter is often desired, usually required to be connected to an infusion fluid supply. This must be carried out with care, as the tubes must be connected correctly in order to avoid potential dangers arising from an incorrect set-up. The set-up stage can be time consuming and therefore reduces the number of treatments which can be carried out using a particular monitoring device. In addition, the requirement to use a separate filter device for ultrafiltration, as well as possibly more than one filter device for filtering blood, increases the equipment costs for each treatment and also the number of connections required.

A further dialyser device is known from DE-A-196 07 162, in which a filtration device for substitution fluid is disclosed along with a hemodiafiltration device integrated within a single housing. Filter membrane means in the form of hollow fibers are provided within both compartments. One end of the hollow fibers of the filter for a substitution fluid is sealed off by means of potting compound or by a cover. A problem encountered with this device is that it is difficult to completely expel all of the air contained within the compartment for the substitution fluid at the start of a filtration process, both the air around the outside of the hollow fibers and in the inside of the fibers. Air on the inside of the fibers is pushed by liquid passing across the membranes into a header chamber at either the blood entry or exit of the dialysis compartment thereby causing unnecessary contact between blood and air in the blood flow circuit. This may be avoided by passing substitution fluid through the filtration compartment prior to passing blood through the hemodiafiltration compartment although this involves additional work for an operator. In addition, air around the outside of the membranes is not completely expelled during the initiation phase of filtration and may be fed through into the blood during a treatment. This increases the thrombogenicity of the blood filtration process. A further drawback of this disclosure exists in that filtration of the substitution fluid takes place from the outside through to the inside of the hollow fiber membranes. This necessitates using a different kind of hollow fiber than those used for the filtration of blood in the hemodiafiltration process in the neighboring chamber, because the direction of the pore size gradient across the membrane thickness requires to be inversed. This requirement greatly complicates the manufacturing requirement of such a device. In addition, when manufacturing a device according to this disclosure, the filling of the respective compartments with hollow fibers is rendered complex and costly.

SUMMARY OF INVENTION

In order to overcome some of the problems associated with known filter devices, a filter device is provided according to the present invention, in which at least two fluid filtration compartments are provided within a tubular filter housing, the respective compartments being separated by a continuous internal wall. In this way, more than one fluid may be filtered at any one time by filter means in respective separate chambers of a single filter device. A first surface of the filter membrane means is in communication with both an inlet and an outlet.

According to the invention, filter membrane means in each compartment each have a first and a second surface, wherein the first or second surface are each in fluid communication with respective external flow ports. The external fluid flow port may be a fluid flow port connected to a fluid supply or drain means, which fluid supply or drain means are located externally of the filter housing. Alternatively, an external fluid flow port may be connected to an inflow port in fluid flow communication with a separate filtration compartment to thereby lead away fluid emerging from a second surface of filter membrane means to be infused in a fluid involved in a separate filtration treatment in another filtration compartment. For example, an infusion fluid having passed across a filtration membrane may be channeled to an inflow or outflow section of an adjacent filtration compartment in which blood is filtered.

A first surface of the filter membrane means in each compartment is in communication with an inlet and an outlet of a fluid filtration compartment thereby insuring that air may be effectively expelled from each compartment during an initial phase of operation of each filter. The filter device of the invention may be operated in such a manner that fluids to be passed across a membrane means in any compartment may be passed from a first surface to a second surface of the membrane means. Where the membrane means are hollow fiber membranes, ultrafiltration usually takes place by passing fluid at a higher pressure through the inside surfaces of the fiber membranes. The fluid then passes through to the outside surface and is filtered in the process. Alternatively, fluid may also be passed from second, exterior surfaces through to the first, inside surfaces of hollow fiber membranes. Filtration may be carried out from the outside surface to the inside surface using a conventional type of fiber or alternatively, using a special fiber the walls of which are adapted for filtration in the said direction. Such fiber may be made from a more rigid material than conventional fiber.

The filter membrane may be comprised of a bundle of hollow fiber, preferably semi-permeable fibers, in which case the first surface designates collectively the insides of the hollow fibers in the bundle and the second surface designates the outside surfaces of the hollow fibers.

Where hollow fibers are employed as filter membrane means, the outside surfaces of the hollow fibers are in communication with the external fluid flow port in the above example. The aforementioned continuous internal wall (or walls) within the filter device of the invention divide the interior of the filter housing into separate filtration compartments, such that there is no fluid communication across the wall (or walls) between the respective filtration compartments.

The filter device of the invention may be configured such that the respective first surface (or first surfaces) of the filter membrane means in more than one compartment are in fluid flow communication with the respective first surface (or first surfaces) of filter membrane means in at least one other compartment. This enables a fluid to be passed through more than one filtration process in series. Such a configuration enables, for example, different filtration conditions to exist in respective filtration compartments. Alternatively, or additionally, the second surface (or surfaces) of a filter membrane means in a filtration compartment may be in fluid flow communication with a first surface (or surfaces) of a filter membrane in another compartment. In this way, for example, the fluid having been purified by passing across the filter membrane of one compartment may be added to the fluid being or having been filtered in another compartment. This may be achieved, for example by means of an external flow port from one filtration compartment being connected for channeling fluid to an inlet or outlet for fluid entering or leaving a first surface of a filter membrane in another compartment.

The tubular housing means of the filter device of the invention may have elongate longitudinally extending walls which may be of any appropriate cross-section, e.g. tubular, circular, elliptical, rectangular, or any other suitable geometry. The longitudinal walls include at least one external wall discontinuous about the circumference, and one or more internal walls extending between opposite ends of the housing. The one or more internal walls divide the interior of the external housing into two or more internal compartments.

The possibility of carrying out a blood filtration treatment at the same time as an ultrafiltration process is especially advantageous. According to a preferred feature of the invention, more than one blood filtration process may be carried out in addition to an ultrafiltration. For example, the outlet portion of the hollow fiber in one filtration compartment may be in fluid communication with the inlet portion of a bundle of hollow fiber in another compartment of the filter device. A replacement infusion fluid ultrafiltered in one compartment of the filter device may then be added to the blood at any stage in the blood filtration process before, after or in one or more of the other compartments of the filter device; e.g. before passage of the blood through the membranes (pre-dilution), between successive treatments (mid-dilution) or after both treatments (post-dilution).

According to preferred features of the invention, there may be provided two or three or more separate filtration compartments for carrying out simultaneous and/or successive filtration treatments. Where three or more compartments are provided, a first fluid such as an infusion fluid may be treated in a first compartment while a second fluid (usually blood, the first fluid being an infusion solution described above) may be subjected to more than one filtration process in series. For example, a hemofiltration treatment may be carried out in a second compartment, the fluid thereby removed from the second fluid escaping from the filter through an external fluid flow port. The second fluid emerging at a fluid outlet of the membranes of the said second compartment may then be directed into the filtration membranes of a third filtration chamber.

Where semi-permeable hollow fibers are used as a filter membrane means, these may be held in place at their ends by a so-called potting compound. The potting compound may consist of a hardened polymer resin, such as two component polyurethane, molded to the internal walls of the tubular housing and serves as a barrier enclosing the second surface of the membranes within a compartment of the tubular housing. It also maintains the apertures of the hollow fiber such that the (internal) first surfaces of the fiber are open at an outlet or inlet end of the housing. The ends of the housing are advantageously enclosed by end cap, thereby providing so-called header chambers.

Each end cap may be constructed so as to enclose more than one header chamber, with each header chamber being provided with at least one fluid inflow or outflow port, and possibly with at least one or more additional fluid flow ports, for example for supplying additives to the fluid within the header chamber. In particular, each end cap may enclose each header chamber in correspondence with each of the filtration compartments internal of the overall filter housing. The header chambers of a single end cap may be separated from one another by wall means and by a seal member placed between the header chamber wall and an internal wall and/or the surface of the potting compound in order to prevent migration of fluid from one header chamber to another. Alternatively, the hollow fiber bundle of more than one filtration compartment may open out into a single header chamber. This may be useful for a filter device intended for mid- or post-filtration dilution with a filtered infusion solution or to provide serial filtration of a fluid in more than one filtration compartment. Alternatively, separate header chambers may be connected for fluid flow by connecting together fluid flow ports of respective header chambers using molded or tubing line conduit means.

The tubular housing of the filter device may be provided, as already mentioned, with any appropriate cross-section. The tubular housing comprises continuous internal walls, which divide the filter into separate filtration compartments. No single compartment would thereby be delimited entirely by peripheral or external walls of the housing, each compartment being delimited at least partly by an internal walls. The housing may for example be tubular, and in one embodiment may be made up of two separate longitudinally extending sections of a housing wall. The respective portions of the tubular housing may be joined together along seam-type joints by any suitable means such as by bonding or welding e.g. using ultrasound or laser welding. In the case of laser-welding techniques, the two sections of the filter housing would benefit from particular light reflective properties in order to ensure an adequate weld. For example, one of the housing sections may be made from substantially clear, uncolored material, while the other may contains a light-reflective dye suitable for causing plastics material at the boundary of the two housing portions to melt sufficiently to form a bond. In a possible embodiment of a laser-welded housing, one housing portion may be made from polycarbonate while another section may be made from polypropylene.

Assembly of the filter device may be achieved by combining the steps of filling the respective filtration compartments as initially defined by the separate sections with hollow fiber and then assembling the tubular housing. For example, hollow fiber may be placed within the respective filtration compartments defined by a respective single section of the tubular housing. The further housing sections may then be brought together and fixed in position enclosing the respective fiber bundles in their compartments in a manner similar to filling an internal space upon which a lid or cover is then placed. The housing which is here, by way of example, shown as tubular sections, may thereby each include corresponding portions of internal walls, whereby the respective edges of the various corresponding wall portions would then desirably be required to be bonded to one another as would the outer walls of the said sections. Bonding may be carried out by any suitable method such as by using adhesive means or by welding as described more fully herein.

Alternatively, the internal wall may not be in portions but instead may be provided integral with a first one of the tubular housing sections, with the second section comprising only an outer wall portion of the housing joined on its internal face to the respective internal and outer wall portions of the aforementioned first section. In either the previous or this latter case, the first section is likely to be somewhat larger than the second section. For example, the first section may make up more than half of the outer circumference or periphery of the resulting housing, while the second portion may make up less than one half of the outer periphery, perhaps as little as one third or one quarter. In the case of a generally rectangular tubular housing of the filter device, one side of the cross-sectional rectangle may be comprised of the second portion or cover portion, while the main first portion of the housing could comprises substantially three sides of the said cross-sectional rectangle. In this case, internal walls could advantageously be provided integral with the said first portion, or with both portions.

In order to improve in one embodiment the methodology for assembling a multi-compartment filtration device, at least one outer wall of a respective filtration compartment may be provided parallel to an internal wall of a same compartment. This feature may enables a more optimal filling of the fiber bundle within each compartment.

An end of the housing portion may be provided with one or more apertures or recesses for engaging the potting compound, which restrains the ends of the hollow fiber bundles. In addition, there may be one or more apertures provided adjacent the ends of the tubular housing which provide for inflow or outflow in order to enable an even distribution of liquid into or from an internal compartment of the housing around the second surfaces (the outside) of the hollow-fiber. Such an embodiment may be useful when the end cap are provided with fluid flow ports for more than one fluid intended to be channeled towards different surfaces of the hollow fiber. In such a case, the fluid intended to flow around the outside of the hollow fiber may flow though a peripheral flow port of an end cap and around a channel formed and bounded by a sill portion of the tubular housing and then through a filtration compartment of the tubular housing.

It is an object of the present invention, therefore, to provide a filter device comprising a housing, the housing enclosing at least two fluid filtration compartments and comprising at least two longitudinally extending shell portions, one of the longitudinally extending shell portions of the housing describing less than one half of the perimeter of said housing.

Another object of the invention is to provide a filter wherein at least one filtration compartment comprises at least two spaced apart generally planar walls and the walls are in a parallel relationship to each other.

A further object of the invention is to provide a filter comprising an internal wall having a first part and a second part, the first part being attached to a first longitudinally extending shell portion and the second part being attached to a second longitudinally extending shell portion, the first part having a free edge and the second part having a free edge, the free edges being configured to join to each other. The free edge of a wall part attached to a shell portion may not be co-planar with the longitudinal edges of that shell portion.

Yet another object of the invention is to provide a filter wherein one of the longitudinally extending shell portions comprises a substantially clear, uncolored material at at least a boundary thereof and wherein another of said longitudinally extending shell portions comprises a colored material at at least a boundary of said another shell portion, whereby a laser or electromagnetic radiation weld may be formed between the boundaries of said shell portions.

It is also an object to provide a filter wherein one of the longitudinally extending shell portions has a first refractive index and another of the longitudinally extending shell portions has a second refractive index, the first refractive index being different from said second refractive index.

Another object of the invention is to provide a method of making a filter device comprising the steps of forming a housing for enclosing at least two fluid filtration compartments, the housing comprising at least two longitudinally extending shell portions, one of said longitudinally extending shell portions of the housing describing less than one half of the perimeter of said housing, adjacent filtration compartments being separated from each other by an internal wall, placing at least one filter membrane having a first surface and a second surface longitudinally in each filtration compartment; closing the shell portions around the filter membranes to form said fluid filtration compartments; sealing adjacent edges of said shell portions; imbedding ends of the filter membranes in a potting compound; and capping the ends of the housing.

It is a further object of the invention to provide such a method further comprising forming one of the longitudinally extending shell portions from a substantially clear, uncolored material at at least a boundary thereof, forming another of said longitudinally extending shell portions of a colored material at at least a boundary of said another shell portion, and sealing adjacent edges comprises by differential heating of the colored material and the uncolored material by laser or electromagnetic radiation.

A further object of the invention is to provide a method of assembling a filter further comprising forming one of the longitudinally extending shell portions from a first material having a first refractive index and another of said longitudinally extending shell portions from a second material having a second and different refractive index, sealing adjacent edges by differential heating by laser or electromagnetic radiation.

The present invention also encompasses a method of making the filter housing of the invention in which the housing is made from two longitudinally extending portions which are bonded together along seam-type joins. A preferred method of bonding is by welding, in particular by laser or ultrasound welding.

The following drawings are included by way of example of some embodiments of the invention.

DETAILED DESCRIPTION

Figure 1:
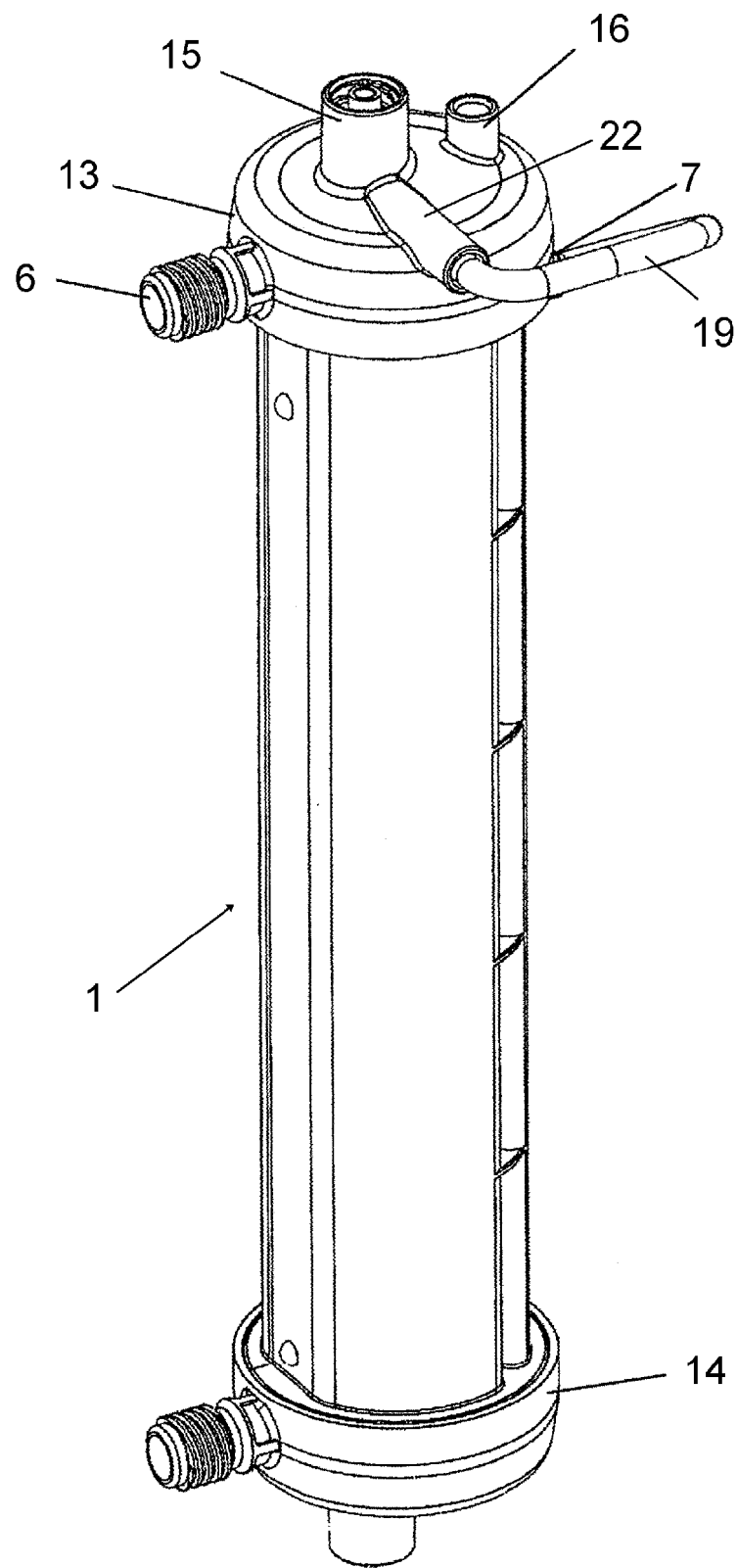
FIG. 1 is an external perspective isometric view of a filter device with two chambers.
Figure 2:
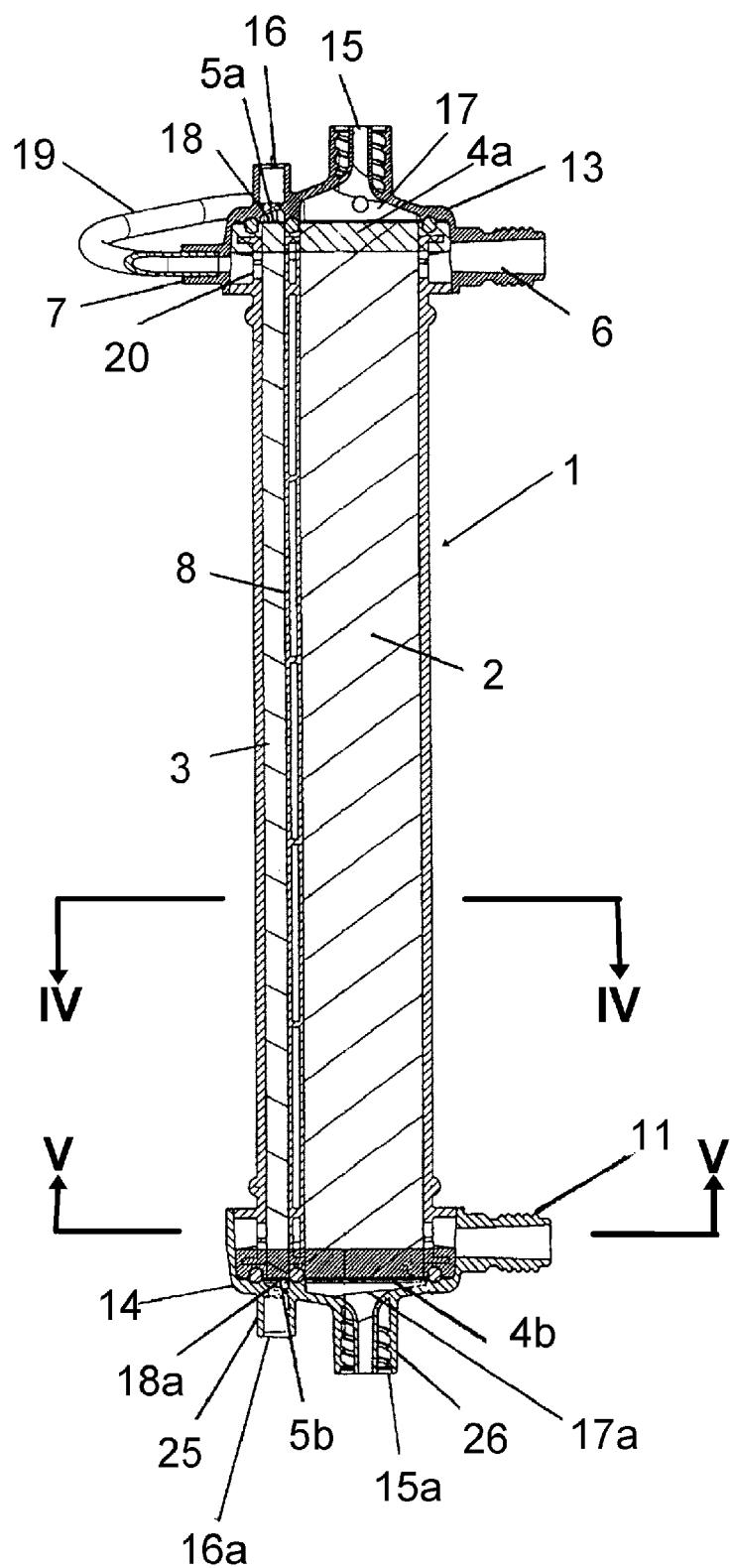
FIG. 2 is a longitudinal section view of the device shown in FIG. 1.
Figure 3:
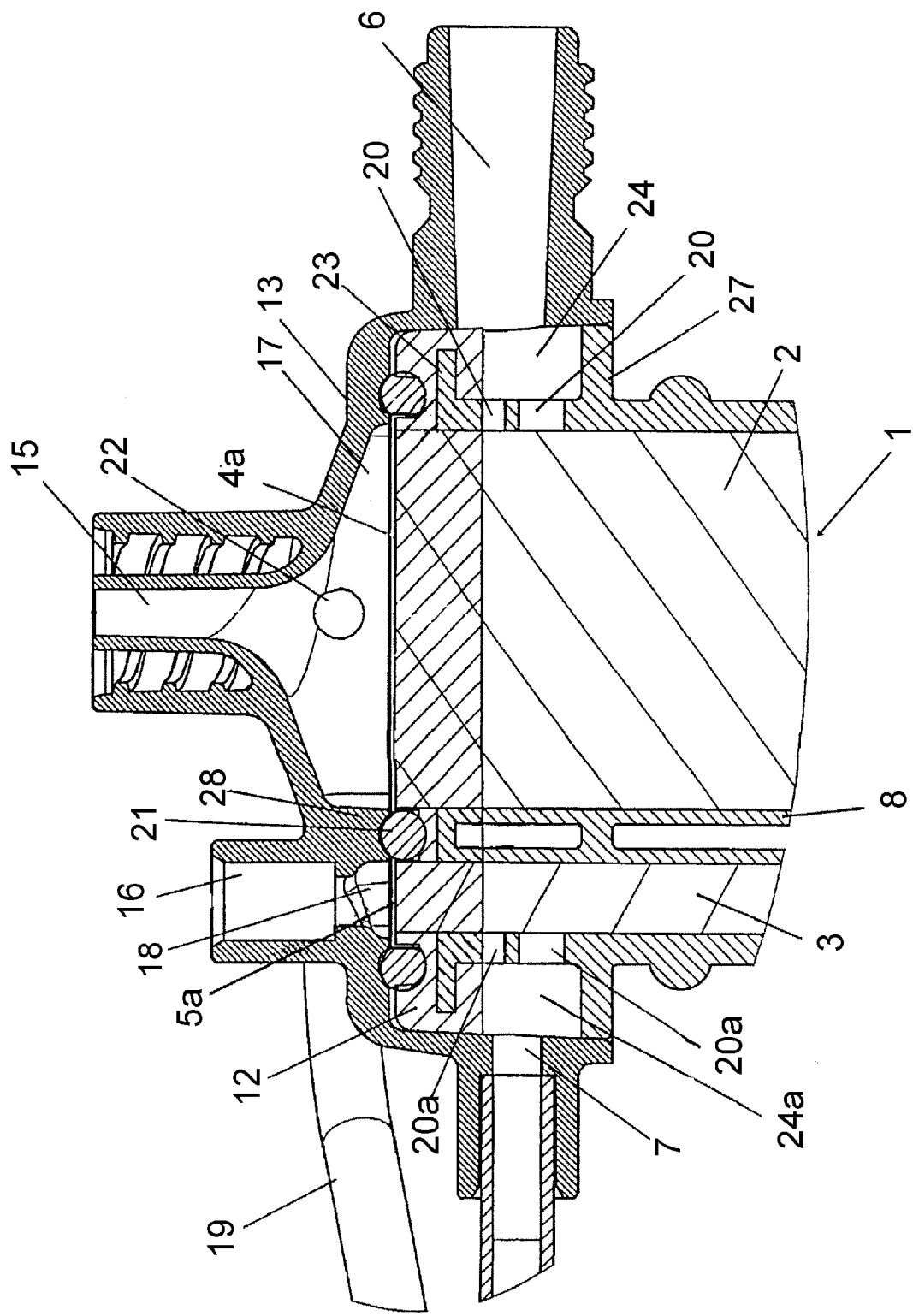
FIG. 3 is a partial longitudinal section view showing detail of an end of a filter device shown in FIGS. 1 and 2.

The filter device shown in FIGS. 1, 2 and 3 comprises a tubular housing 1 and two end cap 13 and 14, one arranged at each end of the housing. The housing 1 is comprised of a longitudinally extending, generally tubular wall having two opposed ends. Respective compartments 2 and 3 are separated by a continuous wall means 8. Filter membrane means (not shown) are arranged longitudinally within respective filtration compartments 2 and 3 (FIGS. 2 and 3). These usually each comprise a bundle of semi-permeable hollow fibers secured at their ends by a potting compound 12 (FIG. 3), which extends around an end portion of the wall of the housing 1. The open ends of the hollow fibers, embedded as shown in the potting compound 12 constitute inlet or outlet apertures 4a, 4b and 5a, 5b for fluid entering or leaving a filtration compartment along a first surface of the filter membrane means therein. In the case illustrated, the open apertures 4a, 4b and 5a, 5b 4, 5 of the ends of the hollow fibers open out into a respective header chamber 17, 18 arranged within the end caps 13, 14. The respective compartments 2 and 3 are separated by a continuous wall means 8.

Figures 2A, 5A:
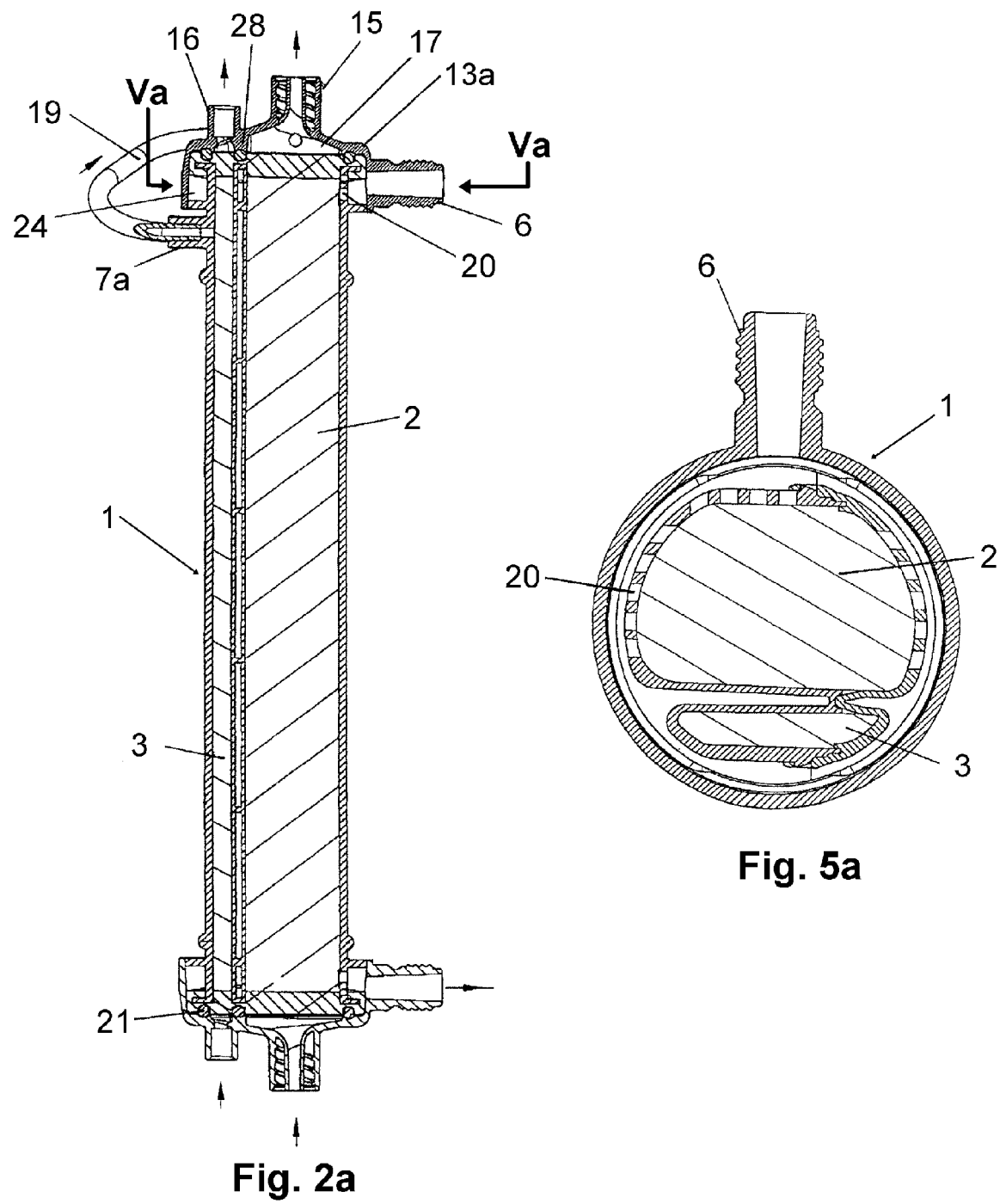
FIG. 2a is a longitudinal section view of an alternative construction of the filter device such as shown in FIG. 2.
FIG. 5a is a cross-section view of an end portion of an alternative construction of the filter device taken along line Va-Va of FIG. 2a FIG. 6 is a detailed view of one end of a tubular housing with the header cap removed.

Fluid inflow and outflow ports 6, 7, 15, 15a, 16 and 16a for a respective first and second fluids are arranged on the end cap 13 and 14 and 14. Ports 15 and 16 and 15a and 16a are in fluid flow communication with header chambers 17, 18 and 17a, 18a inside each end cap 13, 14 and with a first surface of the filter membranes of each filtration compartment 2, 3. External fluid flow ports 6, 7 and 71 are illustrated in fluid flow communication with a respective second side of the filter membranes of each of the respective filtration compartments 2, 3 arranged within the housing 1. The fluid flow ports 6, 7, 11 could optionally be provided on portions of the wall of the housing 1 nearby but not necessarily integral with an end caps shown in (FIGS. 2 and 2a)

A conduit means 19 may be provided for conducting a fluid emerging from the second surface of the filter membranes of a filtration compartment 3 via an external fluid flow port 7 and an optional additional fluid inflow port 22 (see FIGS. 1 and 3) into the header chamber 17 which is in fluid flow connection with another fluid passing along a first surface of filter membrane means of a separate filtration compartment 2. In this way, for example, the ultrafiltrate emerging from an ultrafilter arranged in filtration compartment 3 within the tubular housing 1 may be used to dilute another fluid such as blood, being filtered, by hemofiltration or hemodialysis or hemodiafiltration in additional, discrete filtration compartment 2. Under normal circumstances, the infusion fluid is generated in a filtration compartment at a higher pressure than the pressure of the first fluid such as blood in the inflow or outflow area of the filtration compartment into which the infusion fluid is subsequently directed. As a precautionary measure, a check or non-return valve (not shown) may be present in the conduit means 19 in order to prevent accidental passage of blood from a blood filtration compartment into the ultrafiltration compartment.

As can be seen, the potting compound 12 can be anchored to the tubular housing 1 at a peripheral region and encloses a lip or flange portion 23 formed at the end of the tubular housing 1. The potting compound 12 may additionally be anchored to the tubular housing at fluid distribution apertures 20, 20a in the housing. The apertures 20, 20a are provided in two rows in the example illustrated at FIG. 3, and serve to enhance the flow of fluid between the enclosed peripheral channels 24, 24a and the respective internal filtration compartments 2 or 3 to the second surface (or the exterior surface) of the hollow fibers. The apertures 20, 20a comprise two sets of holes communicating with two separate channels 24, 24a (see FIG. 3). One set of holes 20 communicates with chamber 2 while the other set 20a communicates with chamber 3. These apertures 20, 20a may additionally serve as anchoring means for the potting compound 12 which may flow through some of the apertures while in a liquid phase prior to hardening. To this end, a sill or flange 27 may be provided integral with the housing 1 such that when an end cap 13, 14 is disposed in place upon the tubular housing 1, the channels 24, 24a are present in the space created by the header cap peripheral wall and the housing 1. Inlet ports 6 and 7 can therefore be provided in a lateral or peripheral portion of the end cap 13 for inflow or outflow of fluids to or from the outside of the hollow fibers.

In the device illustrated in FIG. 2, infusion fluid to be purified may be fed into the filtration compartment 3 through inflow port 25. The fluid then passes into a lower header chamber 18a of the end cap 14 which communicates with filtration compartment 3, after which it passes along the inside surface (first surface) of the hollow fiber membranes of the fiber bundle inside the filtration compartment 3. In order for the fluid to penetrate inside the fibers during an initial priming stage, the outlet flow port 16 is held open for air to escape from the filtration compartment 3 before it becomes filled with infusion fluid. The outlet port 16 may then be closed when infusion fluid has filled the filter membranes, after which the infusion fluid is forced by a pressure gradient across the membranes and through to the second, exterior surface of the membranes, from which it leaves the filtration compartment 3 through external flow port 7.

The two header chambers 17, 18 are clearly visible in FIG. 3, separated from one another by wall portion 28 of the end cap 13 and by an additional seal 21. A conduit 19 is partly shown, this being provided connected to flow port 22 and also to the outlet port 7 for the first fluid e.g. ultrafiltrate, emerging from the first filtration compartment 3. This corresponds to either a pre- or post-dilution setup, in which infusion fluid entering the header chamber 17 via fluid flow port 22 is infused into a second additional fluid prior to or after passing through the hollow fiber bundle contained within the filtration compartment 2. The second fluid could be made to flow in either direction (up or down) in this example.

Figure 4:
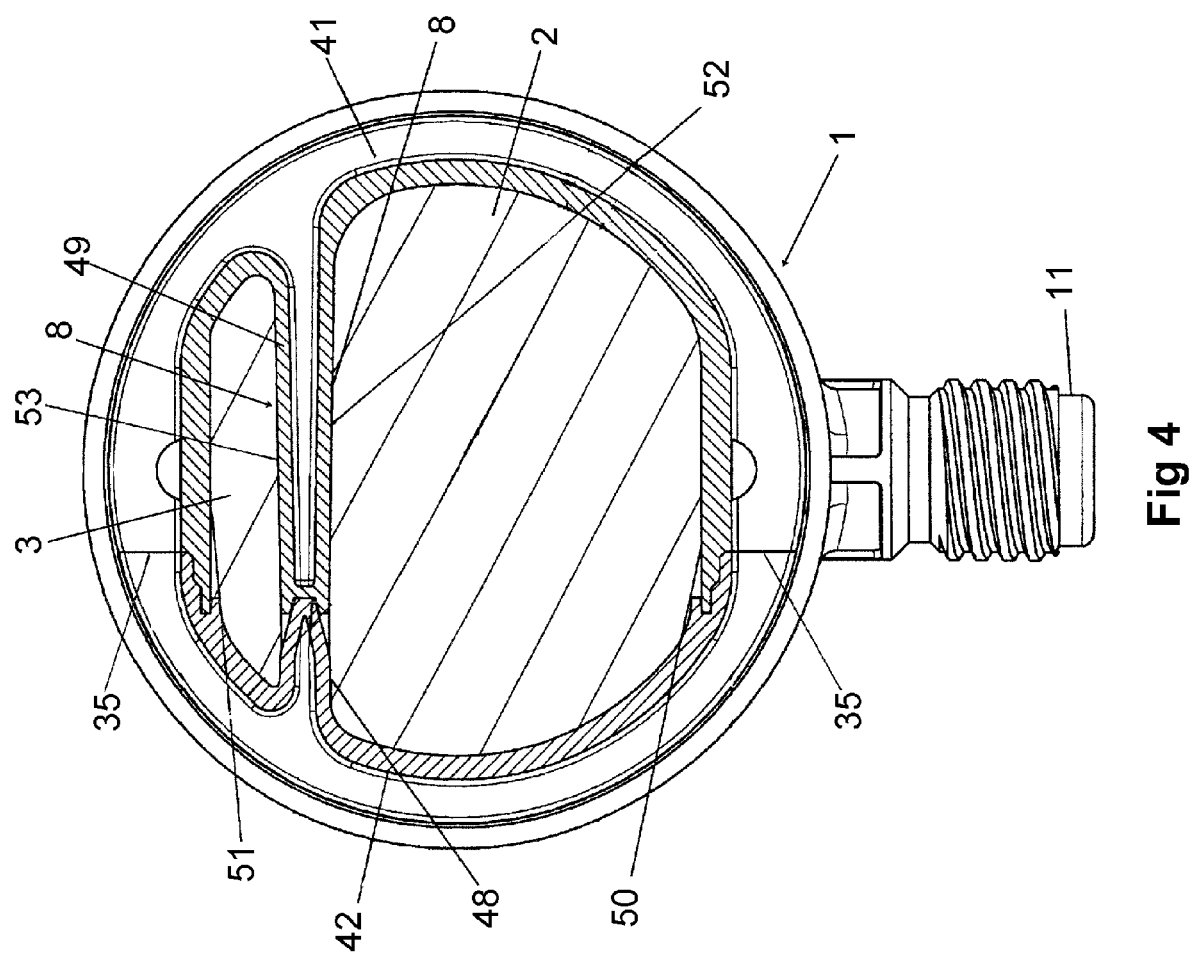
FIG. 4 is a cross-section view of a middle portion of a filter device taken along line IV-IV of FIG. 2
Figure 5:
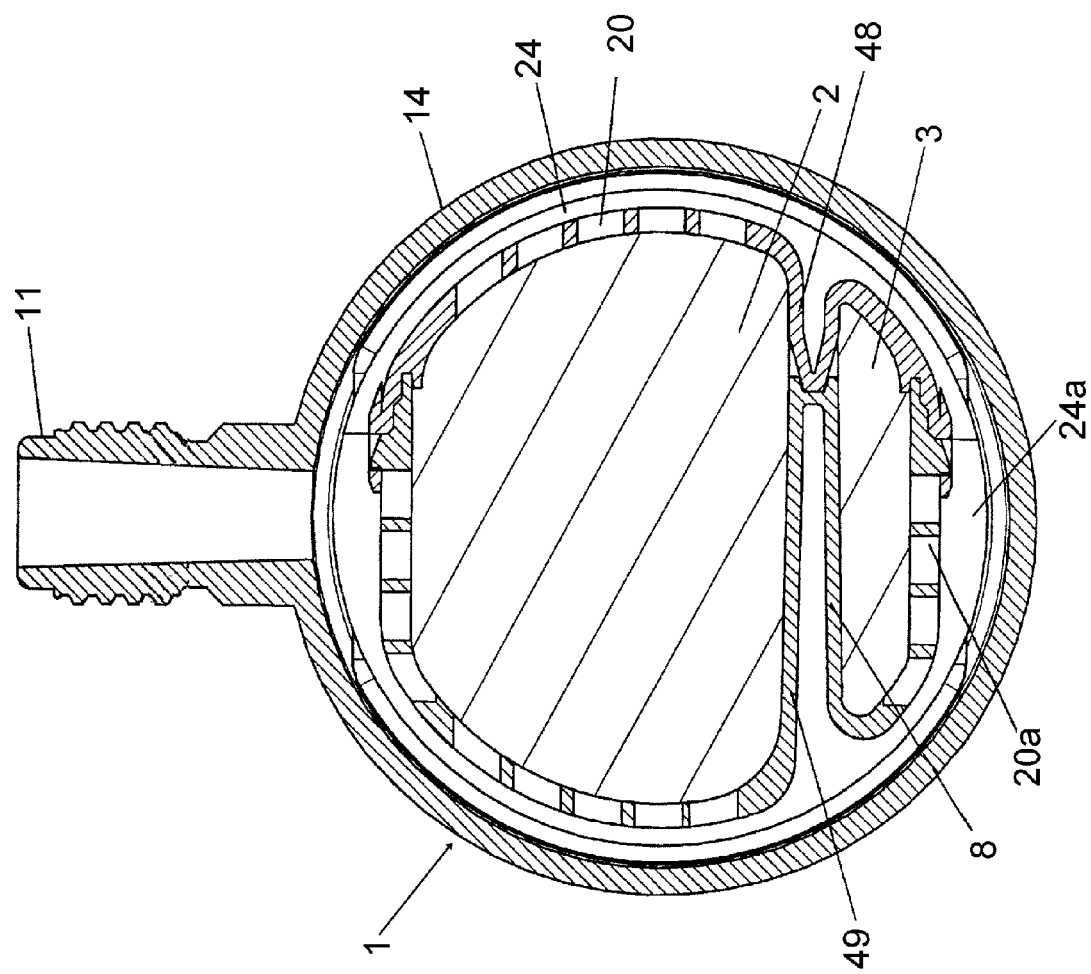
FIG. 5 is a cross-section view of an end portion of a filter device taken along line V-V of FIG. 2

A possible construction of the filter device, in particular, the housing of the filter device can be appreciated from FIGS. 4 and 5. Two sections 41 and 42 of the housing 1 are shown joined at seams 35 of peripheral wall portions 51, 50 as well as at internal wall portions 48, 49 which together make up continuous internal wall 8 and which furthermore define internal surfaces 52 and 53. As can be seen in FIGS. 4 and 5, the first internal wall portion 49 is attached to a first longitudinally extending shell portion or section 41 and the second internal wall portion 48 is attached to a second longitudinally extending shell portion or section 42. The first internal wall portion has a free edge and the second internal wall portion also has a free edge. The free edges are configured to join to each other. As can also be seen in FIGS. 4 and 5, the longitudinal edges of adjacent shell portions are configured to join to each other, and the free edge of a wall part attached to a shell portion is not co-planar with the longitudinal edges of that shell portion. More particularly, a larger one of the longitudinally extending shell portions 41, 42 of the housing describes more than one half of the perimeter of the housing and the free edge of the internal wall portion 49 attached to the larger shell portion 41 extends beyond a plane containing the longitudinal edges of the larger shell portion 41. As introduced above, end cap 14 may comprise a fluid inflow port 11 which may be molded integrally therewith and which may allow fluid such as for example dialysis fluid to flow to or from the outside surface or surfaces of membrane means within compartment 2. During the fabrication of the device, fiber bundles may be laid within the compartments 2 and 3 prior to closing the compartments by joining section 42 to section 41. In order to increase the density of the fibers within the housing, the wall surfaces 50, 51, 52 and 53 are arranged to be substantially parallel. The internal wall portions 48, 49 may advantageously be provided hollow along one or more portions of their length, in order to reduce material usage and for uniformity of wall thickness throughout the housing portions. In FIG. 5, the enclosed channels 24, 24a are shown allowing fluid to flow through or from port 11 and into or out of a filtration chamber 2 via apertures 20, 20a. A similar channels 24, 24a (not shown in FIG. 4 or 5) is provided in the upper end cap 13. The apertures 20 in filtration compartment 2 are kept separate from the channel 24a and apertures 20a of filtration compartment 3 by means of either a seal (not shown) or by additionally including barrier means (not shown) between the internal wall portions 48, 49 and the outer regions of the wall of end cap 14.

Figure 6:
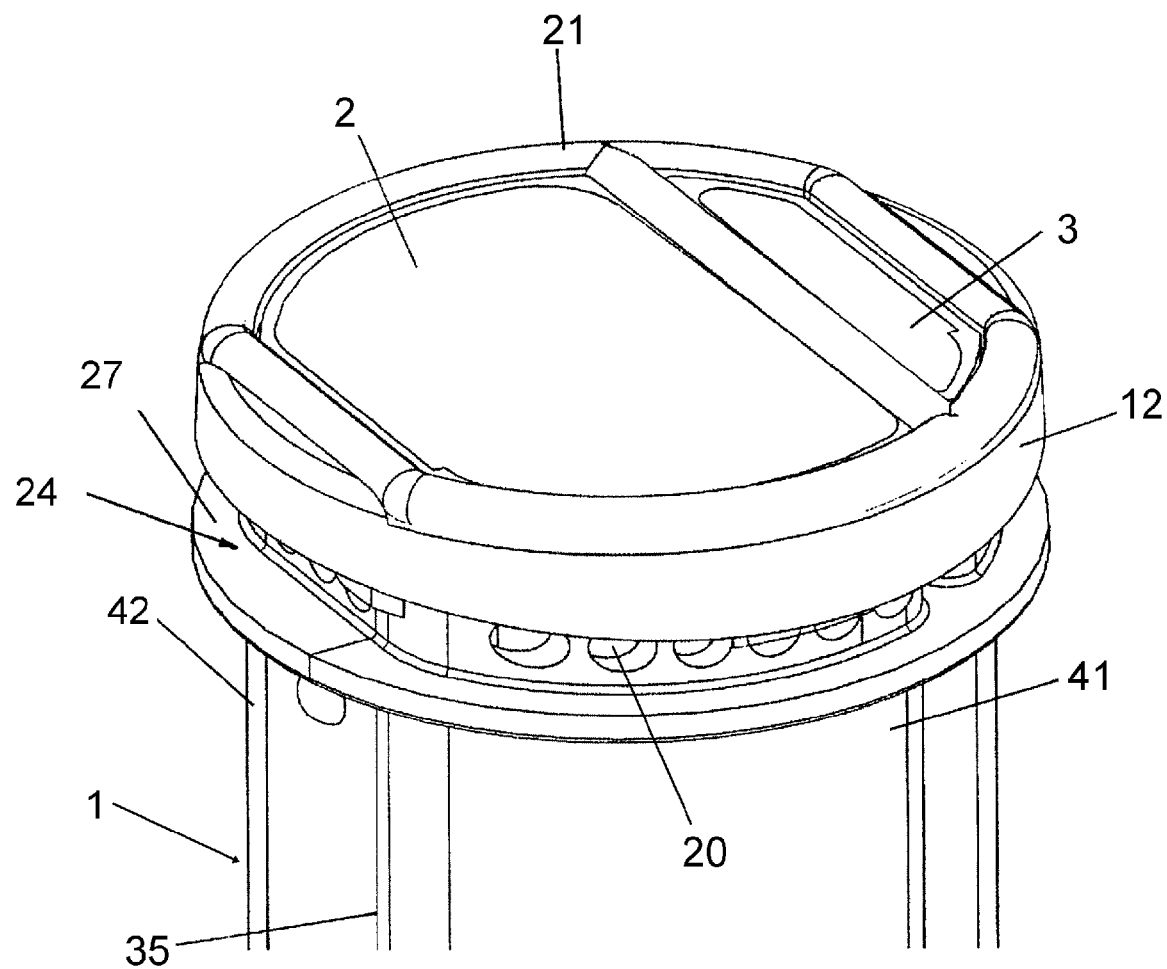

In FIG. 6, the end portion of a housing according to an embodiment of the invention is illustrated. As introduced in FIGS. 2 and 3 above, a sill 27 around an outside portion of the wall of the housing 1 is shown, around which an end cap may be sealingly fitted. An upper portion of the housing wall is provided with apertures 20 which serve two purposes. On the one hand, these apertures serve to provide an anchoring means for the potting compound 12, which secures the hollow fibers. In addition, some of the apertures serve as inlets into the filtration compartment on the outside surface of hollow fibers contained therein. The fluid may thereby be distributed into the compartment inflowing from the external port. Seal means 21 (as shown e.g. in FIG. 3) are shown in position corresponding to the positions of the respective housing outer walls and the inner walls separating the respective filtration compartments 2 and 3.

In FIGS. 2a and 5a, there is shown a possible embodiment of the filter device in which only the filtration compartment 2 intended for dialysate fluid flow in a blood filtration process is provided with liquid distribution apertures 20 at the ends of the compartment. Dialysis liquid may thereby flow first through fluid flow port 6 and to the outside of the filter membranes inside filtration chamber 2 via the peripheral channel 24 and the distribution apertures 20 and via the peripheral channel 24. In this embodiment the ultrafiltration compartment 3 is provided with an external flow port 7a on the wall of the housing 1. The arrangement shown in FIGS. 2a and 5a avoids the potential need for an additional seal or wall component possibly requiring welding between the internal walls separating the respective chambers 172, and 183 and the inside of the end cap 13 of the previously described embodiment.

In FIG. 6, the end portion of a tubular housing according to a possible embodiment of the invention is illustrated. A sill 27 around an outside portion of the wall of the housing 1 is shown, around which an end cap may be sealingly fitted. An upper portion of the housing wall is provided with apertures 20 which serve two purposes. On the one hand, these apertures serve to provide an anchoring means for the potting compound which secures the hollow fibers. In addition, some of the apertures serve as inlets into the filtration compartment on the outside surface of hollow fibers contained therein. The fluid is thereby distributed into the said compartment more evenly than by a local inflow at one external port only. Seal means 21 are shown in position corresponding to the positions of the respective housing outer walls and the inner walls separating the respective filtration compartments 2 and 3.

Figure 7:
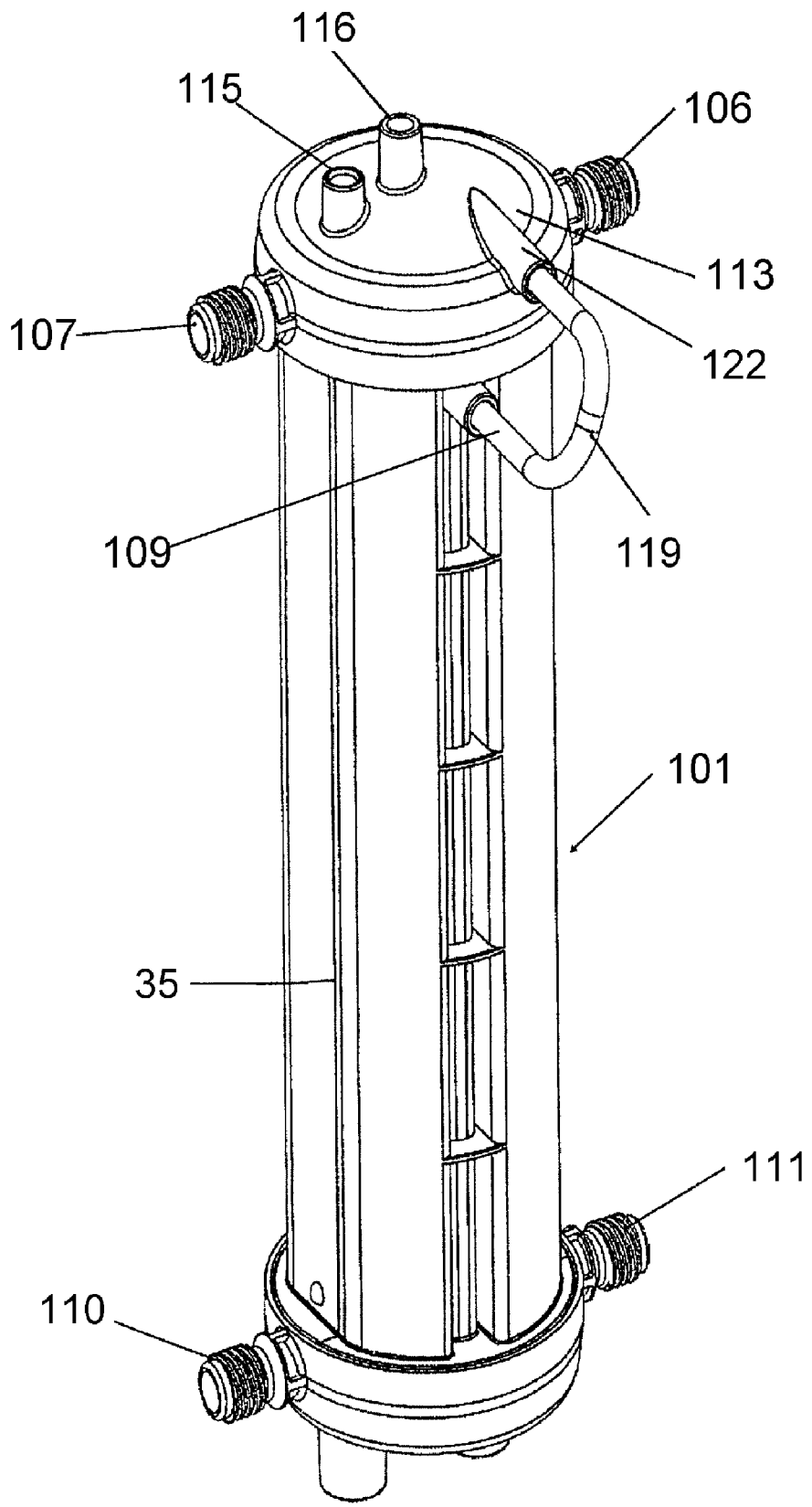
FIG. 7 is an isometric perspective view of a filter device having three filtration compartments.
Figure 8:
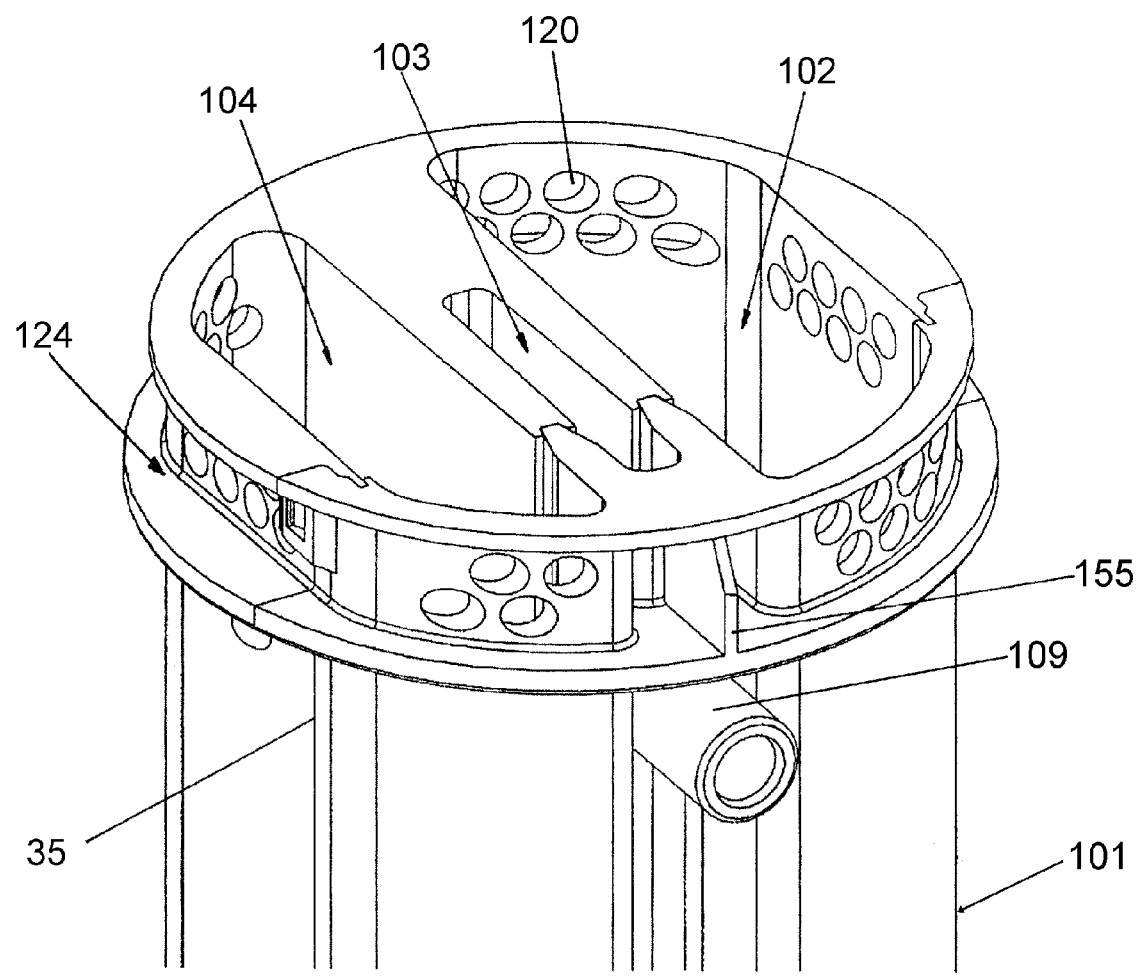
FIG. 8 is an isometric perspective partial view of an end of the housing of the filter device of FIG. 7.

In FIGS. 7-10 with first reference to FIGS. 7 and 8, a filter device having three internal filtration compartments within a unitary housing 101 is illustrated. In this case, a first filter, e.g. an ultrafiltration filter, is provided in a compartment 103 located adjacent and between two outer, dialysis-type filtration compartments 102, 104. Fluid flow ports 106 and 107 allow fluid such as dialysis fluid to enter or leave filtration compartments communicating with a second surface of filter membranes provided therein. In the example shown, these are provided at a peripheral portion of an end cap 113, although they could also be provided on the wall of the housing 101 (see the example of FIGS. 2a and 5a). Distribution apertures 120 may be used to ensure anchoring of the potting compound (not shown) and allow inflow and outflow of fluids via an enclosed channel 124 as in the two compartment model described previously. In the embodiment shown, fluid inflow and outflow means to the second surface of the filter membranes of the ultrafiltration compartment 103 may be provided molded integrally with the wall of the housing 101. A conduit 119 may provide for infusion fluid emerging from compartment 103 via port 109 to flow into a header chamber within end cap 113 via inlet port 122, where it is added to another fluid, e.g. blood passing across the first surfaces of filtration membranes in either or both of compartments 102 and 104.

Figure 9:
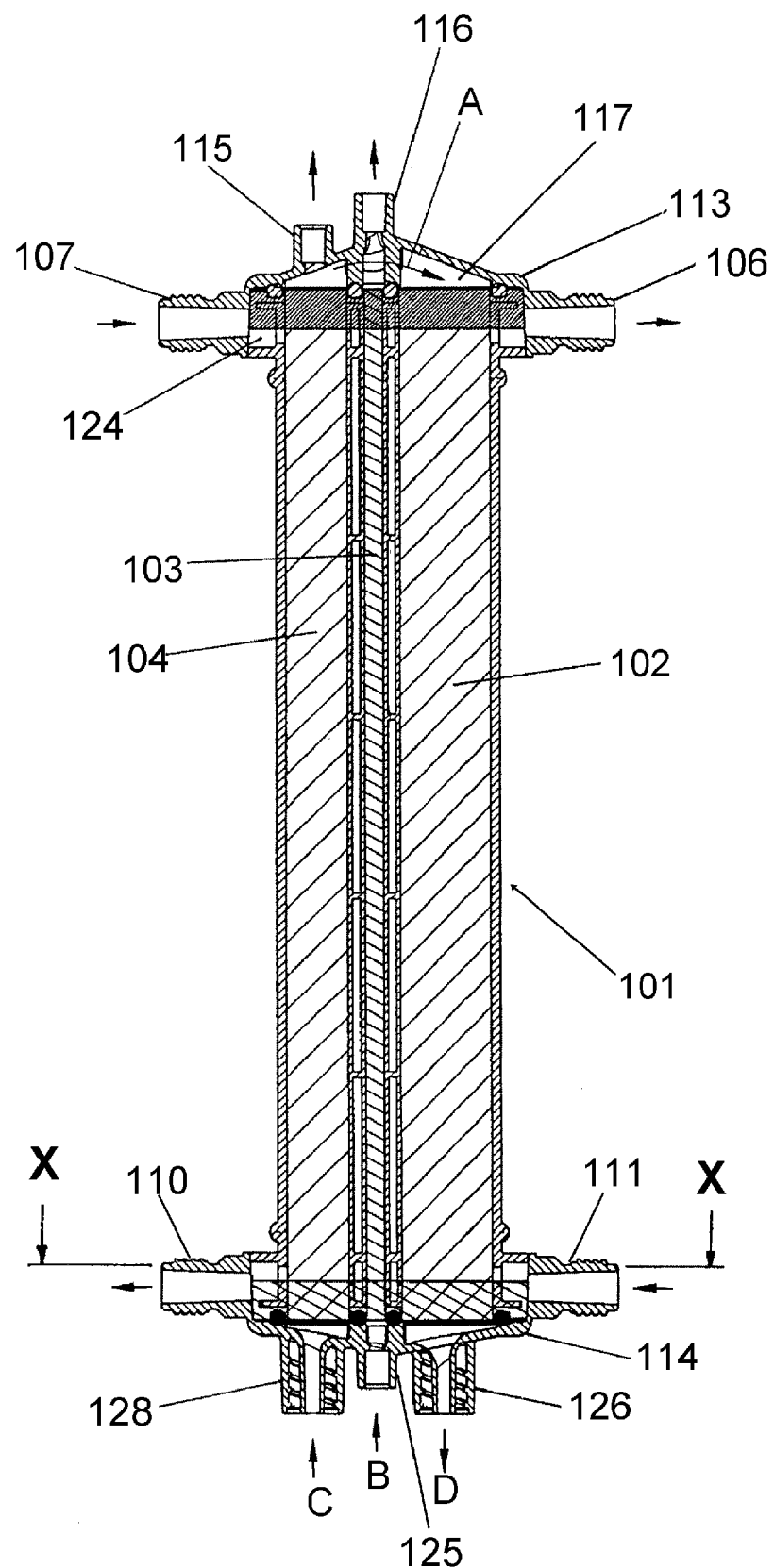
FIGS. 9 and 9a are longitudinal section views of a three-compartment filtration device.
Figure 9A:
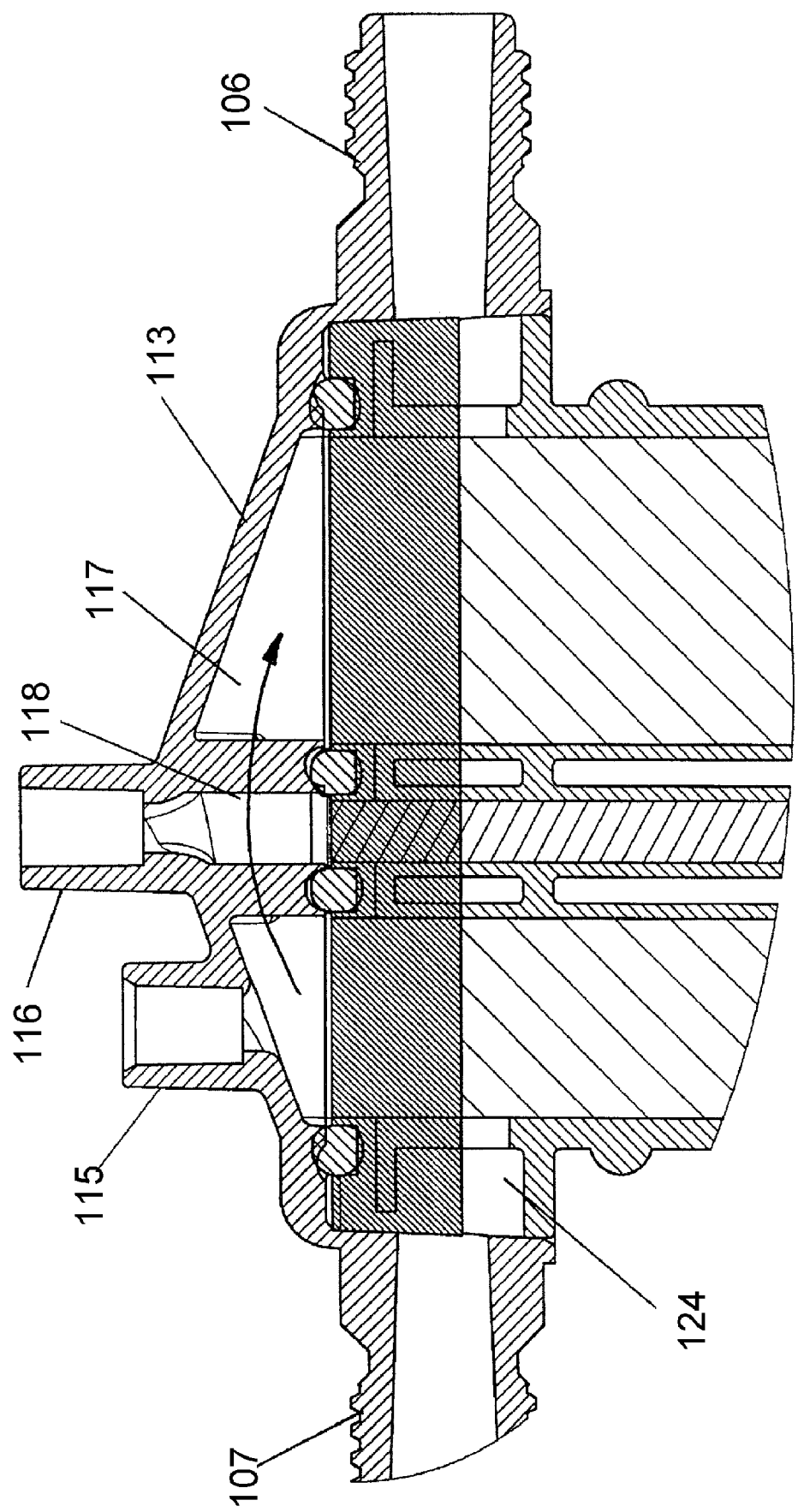
Figure 10:
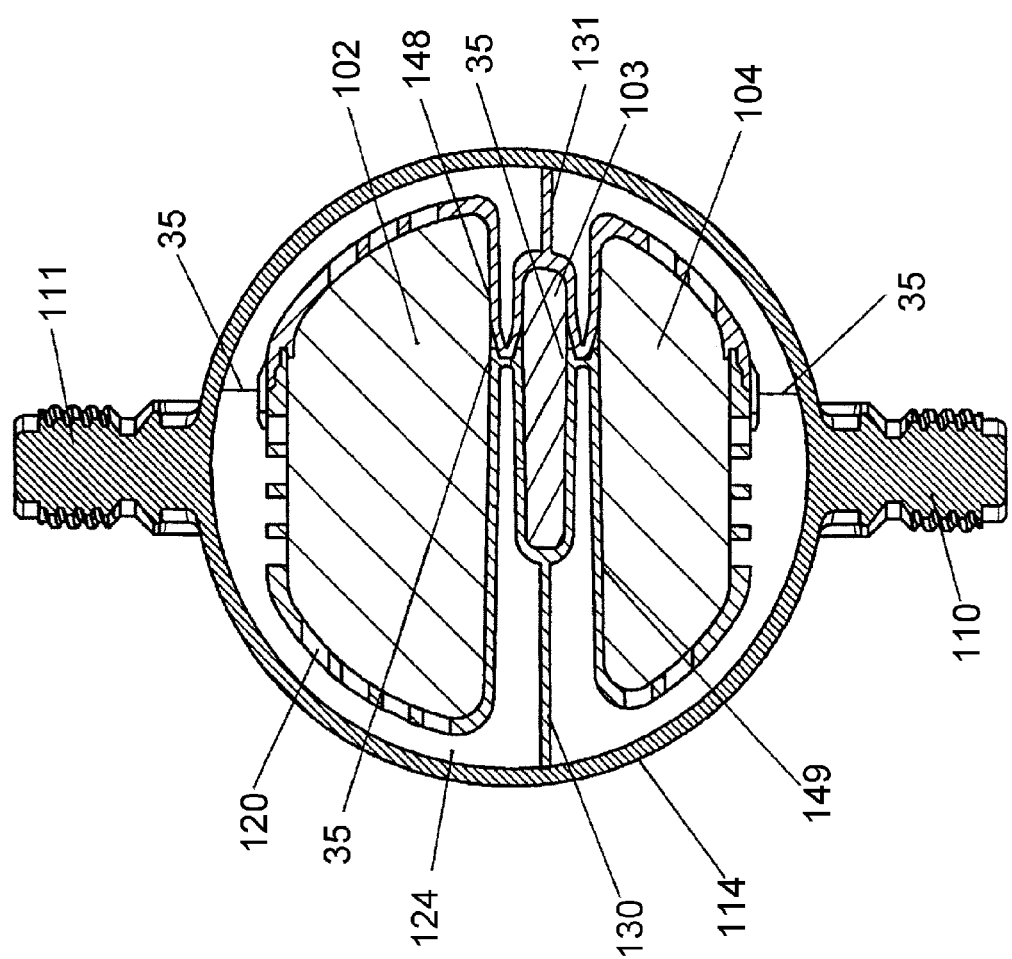
FIG. 10 is a cross-section of an end of the filtration device of FIG. 9., taken along line X-X of FIG. 9

In FIGS. 9, 9a and 10 a three compartment device is shown in respective longitudinal section and in cross section. The internal compartments of the device are defined by two wall portions 148 and 149 joined at seam portions 35. These define between them a central compartment 103, and two outer compartments 102 and 104. Some internal walls of the device are in parallel configuration in order to optimize the filling of the internal spaces with hollow fiber membranes. From FIG. 9, 9a it can be seen from arrow A that header chamber 117 within the upper end cap 113 may be configured such that the respective first surfaces of filter membrane means within compartments 102 and 104 can be disposed in fluid flow communication. This enables, for example two different blood filtration type processes to be carried out simultaneously and/or in series within a single filter device, in addition to an ultrafiltration step of, for example, an infusion fluid. The infusion fluid in the arrangement may be added to the blood via exit flow port 109 (FIGS. 7 and 8), through conduit 119 (FIGS. 7 and 8) and an additional inflow port 122 (shown in FIG. 7) in the header chamber 117 in an arrangement corresponding to a mid-dilution step. Flow port 115 is optional and may serve for fluid inflow or outflow or may serve to bleed air from the compartment 104 while it is being filled with e.g. blood or otherwise being primed, before being sealed again prior to the commencement of filtration.

The wall members 130 and 131 (FIG. 10) may keep separate the dialysate flowing around channel 124 into or out of chambers 102 and 104. The wall means could be replaced by an equivalent seal means (not shown).

In use, an infusion fluid may be passed into the flow port 125 (FIG. 9) as indicated by arrow B. During initial filling of the compartment 103 (e.g. during priming), air may be let out through flow port 116. Once the compartment 103 is filled, the flow port 116 is may be sealed and purified infusion fluid (or other priming fluid which may be used) flows across the membrane means of the filtration compartment 103 emerging from a second surface of the membrane means through a fluid outlet 109 as shown in FIG. 7. The fluid may be channeled into the header chamber 117 via conduit 119 already described. A second fluid, usually blood, may be passed through the filter device in the direction of arrow C first through flow port 128 and then to filtration compartment 104 along a first surface of filter membrane means therein (not shown). Air may be bled from the chamber at port 115 (e.g., during priming or during use), before the blood flows across the header chamber 117 along the direction of arrow A and onto the first side of filter membrane means in compartment 102 before exiting along the direction of arrow D at flow port 126. As an alternative to providing a communicating header chamber between respective filtration compartments, a conduit could be connected to fluid flow ports of whichever header chambers it may be desired to connect. Dialysis fluid may be passed into the compartments 104 and 102 via flow ports 107 and 111 respectively and may exit the compartments through ports 106 and 110. Alternatively, as in hemofiltration, fluid may be removed without addition of dialysis fluid, in which case corresponding inflow ports may be kept sealed. As is obvious, the device shown in FIG. 9 may be operated in a number of combinations of filtration processes described previously in this specification.

Figure 11:
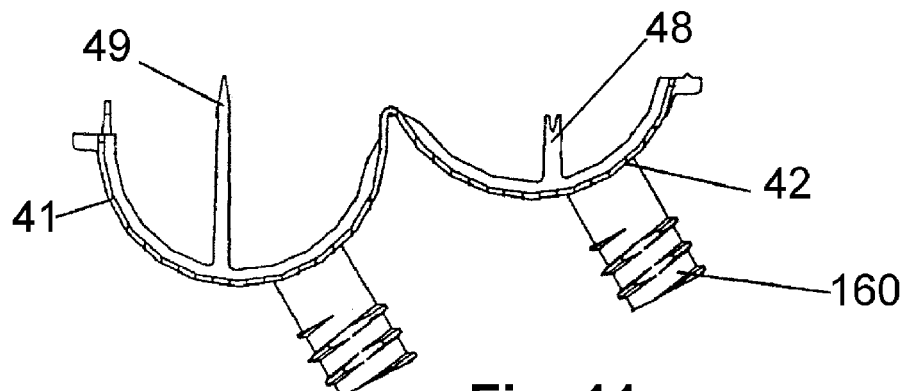
FIGS. 11 and 11a are end views of a dismantled and assembled shell portion of a housing.
Figure 11A:
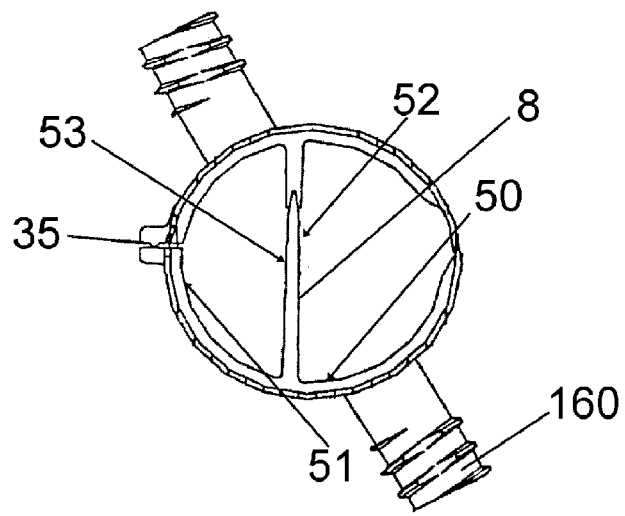
Figure 12:
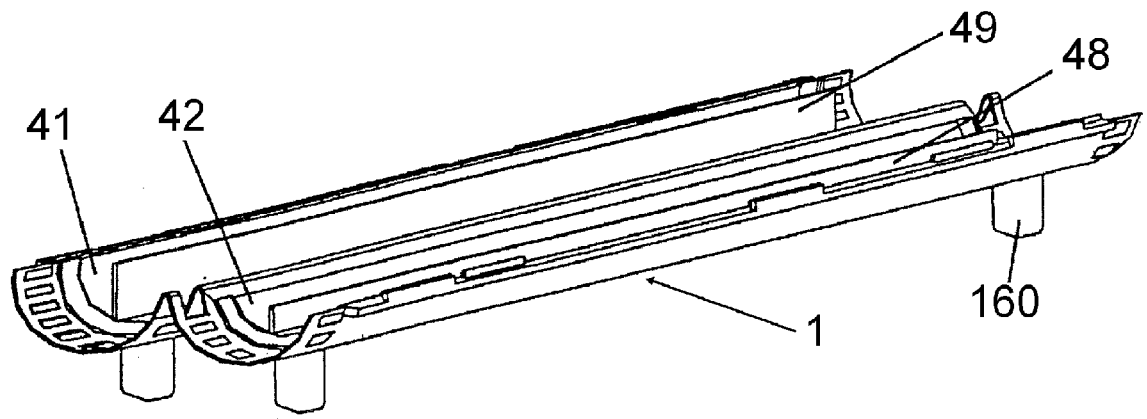
FIG. 12 is an isometric view of a disassembled housing.
Figure 13:
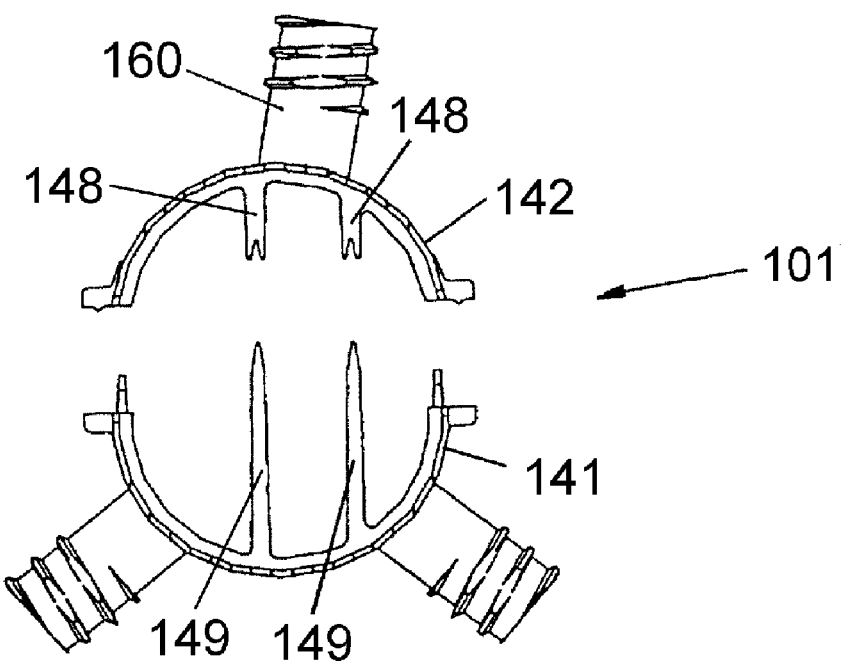
FIGS. 13 and 13a are end views of a further dismantled and assembled housing.
Figure 13A:
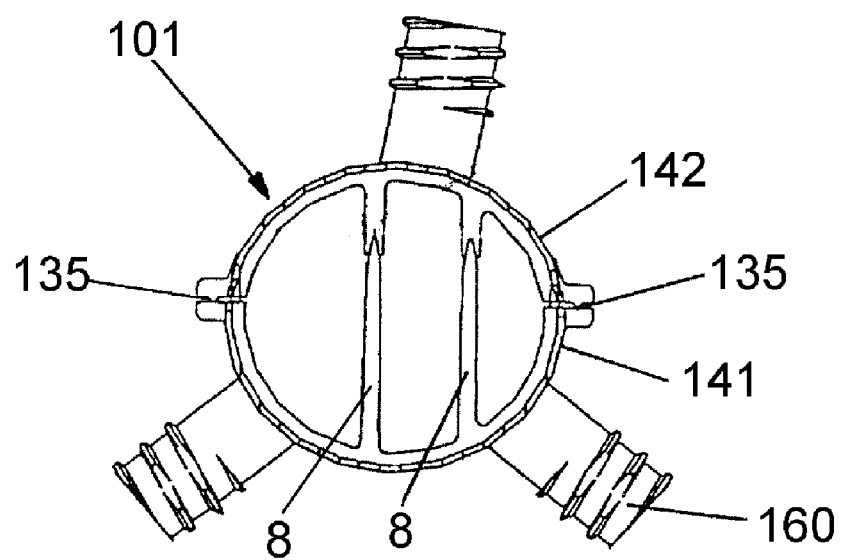

In FIGS. 11, 11a, 12, 13 and 13a, various possibilities are shown for connecting together shell portions 41, 42, 141, 142 of housing 1, 101. FIGS. 11, 11a and 12 show a possibility in which a two compartment housing 1 is formed from hinged housing shell sections 41, 42. Continuous wall means 8 consists of wall portions 48 and 49. As an alternative (not shown) the wall means 8 could be made from a single wall portion either integral with one shell portion 41 or 42 or it could be fixed to the shell portions 41, 42 using a bonding technique. Numeral 160 denotes fluid flow ports in general which may be inflow or outflow ports. In the FIGS. 11, 11a, 12, 13 and 13a the flow ports 160 are shown schematically integral with walls of housing 1, 101, although these could equally well be provided at end cap of the filter device. The hinged housing 1 could be employed for a three compartment type device or for a device with more than three compartments. Bonding of the housing 1 is achieved by welding or by adhesive means along seam 35, 135 (see also FIG. 4). FIGS. 13 and 13a show a similar housing 101 in two parts which are shell portions 141 and 142. These are bonded or welded along laterally and longitudinally arranged seams 135. The device of FIGS. 13 and 13a is shown with three compartments 102, 103 and 104, although the same technique could be employed for a device having only two compartments or for a device having more than three compartments. As in FIGS. 11, 11a and 12, the continuous wall portions 8 could be provided either from wall portions 148 and 149 or from a single portion attached to only one shell segment or added as a separate element. Furthermore, the respective portions may be held in an opened position as shown in FIG. 12 for filling with filter means such as hollow fiber bundles in each respective compartment of shell portion 41 or 141 before completing the housing 1, 101 by closing shell portion 42, 142 on top of said portion 41 in which filter means are laid longitudinally.

In all of the embodiments illustrated and described above, the internal wall portions 48, 49, 148, 148 may be welded together or bonded to thereby create internal walls 8 and to generate an integral filter housing. One method of welding includes laser welding as mentioned or welding using other electromagnetic means. The welding may be carried out while filter means such as membranes in the form of hollow fibers are in place within respective chambers in the housing. Materials used for the housing may advantageously include materials having particular light reflective properties in order to ensure an adequate weld. For example, one of the housing sections may be made from substantially clear, uncolored material, while the other may contain a light-reflective dye suitable for causing plastics material at the boundary of the two housing portions to melt sufficiently to form a bond. In another possible embodiment of a laser-welded housing, one housing portion may be made from polycarbonate while another section may be made from polypropylene. The different refractive indices of the materials may produce sufficient heat for a weld to form when laser or electromagnetic radiation is aimed at the join or seam 35, 135.

The invention claimed is:

1. A filter device comprising a housing, said housing enclosing at least two fluid filtration compartments, each filtration compartment comprising at least one filter membrane having a first surface and a second surface, said first surface of each filter membrane being in fluid communication with at least one fluid flow port, said second surface being in fluid communication with at least one fluid flow port, adjacent filtration compartments being separated from each other by an internal wall, said housing comprising at least two longitudinally extending shell portions, one of said longitudinally extending shell portions of the housing describing less than one half of the perimeter of said housing, wherein said internal wall comprises a first part and a second part, said first part being attached to a first longitudinally extending shell portion and said second part being attached to a second longitudinally extending shell portion, said first part having a free edge and said second part having a free edge, said free edges being configured to join to each other.

2. The filter device of claim 1, wherein each longitudinally extending shell portions has two longitudinal edges, the longitudinal edges of adjacent shell portions being configured to join to each other, and wherein the free edge of a wall part attached to a shell portion is not co-planar with the longitudinal edges of said shell portion.

3. The filter device of claim 2 wherein a larger one of said longitudinally extending shell portions of the housing describes more than one half of the perimeter of said housing and wherein said free edge of said wall part attached to said larger shell portion extends beyond a plane containing said longitudinal edges of said larger shell portion.

4. A filter device comprising a housing, said housing enclosing at least two fluid filtration compartments, each filtration compartment comprising at least one filter membrane having a first surface and a second surface, said first surface of each filter membrane being in fluid communication with at least one fluid flow port, said second surface being in fluid communication with at least one fluid flow port, adjacent filtration compartments being separated from each other by an internal wall, said housing comprising at least two longitudinally extending shell portions, one of said longitudinally extending shell portions of the housing describing less than one half of the perimeter of said housing; wherein one of said longitudinally extending shell portions has a first refractive index and another of said longitudinally extending shell portions has a second refractive index, said first refractive index being different from said second refractive index.

5. The filter device of claim 4 wherein said one of said longitudinally extending shell portions is comprised of polycarbonate and said another of said longitudinally extending shell portions is comprised of polypropylene.

6. A method of making a filter device comprising the steps of
   forming a housing for enclosing at least two fluid filtration compartments, said housing comprising at least two longitudinally extending shell portions, one of said longitudinally extending shell portions of the housing describing less than one half of the perimeter of said housing, adjacent filtration compartments being separated from each other by an internal wall,
   placing at least one filter membrane having a first surface and a second surface longitudinally in each filtration compartment;
   closing said shell portions around said filter membranes to form said fluid filtration compartments;
   sealing adjacent edges of said shell portions;
   imbedding ends of said filter membranes in a potting compound; and
   capping the ends of said housing; said method further comprising providing at least two spaced apart generally planar walls in each fluid filtration compartment, said walls being in a parallel relationship to each other and packing a plurality of filter membranes between said walls; said method
further comprising
   forming one of said longitudinally extending shell portions from a substantially clear, uncoloured material at least a boundary thereof,
   forming another of said longitudinally extending shell portions of a coloured material at least a boundary of said another shell portion, and
   wherein said step of sealing adjacent edges comprises differential heating of said colored material and said uncoloured material by laser or electromagnetic radiation.

7. A method of making a filter device comprising the steps of
   forming a housing for enclosing at least two fluid filtration compartments, said housing comprising at least two longitudinally extending shell portions, one of said longitudinally extending shell portions of the housing describing less than one half of the perimeter of said housing, adjacent filtration compartments being separated from each other by an internal wall,
   placing at least one filter membrane having a first surface and a second surface longitudinally in each filtration compartment;
   closing said shell portions around said filter membranes to form said fluid filtration compartments;
   sealing adjacent edges of said shell portions;
   imbedding ends of said filter membranes in a potting compound; and
   capping the ends of said housing; said method further comprising providing at least two spaced apart generally planar walls in each fluid filtration compartment, said walls being in a parallel relationship to each other and packing a plurality of filter membranes between said walls; said method further comprising
   forming one of said longitudinally extending shell portions from a first material having a first refractive index and
   forming another of said longitudinally extending shell portions from a second material having a second refractive index, said first refractive index being different from said second refractive index, and
   wherein said step of sealing adjacent edges comprises differential heating of said first material and said second material by laser or electromagnetic radiation.

8. The method of claim 7 comprising
   forming said one of said longitudinally extending shell portions from polycarbonate, and
   forming said another of said longitudinally extending shell portions from polypropylene.

9. A filter device comprising
   a housing, said housing having
      at least two longitudinally extending shell portions
         one of said longitudinally extending shell portions having a first optical property and
         another of said shell portions having a second optical property, said first optical property being different from said second optical property,
      at least one filter membrane disposed within said housing and extending longitudinally from a first end to a second end of said housing,
      end caps closing said ends of said housing, and
      at least one access port for introducing fluid into or out of said filter device.

10. The filter device of claim 9 wherein said optical property is colour.

11. The filter device of claim 9 wherein said optical property is a refractive index.

12. The filter device of claim 11 wherein said one of said longitudinally extending shell portions is comprised of polycarbonate and said another of said longitudinally extending shell portions is comprised of polypropylene.

13. The filter device of claim 9, wherein said longitudinally extending shell portions are welded together.

14. The filter device of claim 13, wherein said longitudinally extending shell portions are laser welded.

15. The filter device of claim 13, wherein said longitudinally extending shell portions are ultrasound welded.

16. The filter device of claim 9 wherein said housing further comprises an internal wall, said wall separating said housing into first and second compartments, said wall having
   a first wall portion extending from said one of said longitudinally extending shell portions and having said first refractive index and
   a second wall portion extending from said another of said longitudinally extending shell portions and having said second refractive index, said first wall portion being welded to said second wall portion.

* * * * *